(12) United States Patent
Chen et al.

(10) Patent No.: US 9,990,302 B2
(45) Date of Patent: Jun. 5, 2018

(54) TAG MEMORY AND CACHE SYSTEM WITH AUTOMATING TAG COMPARISON MECHANISM AND CACHE METHOD THEREOF

(71) Applicant: National Chiao Tung University, Hsinchu (TW)

(72) Inventors: Tien-Fu Chen, Hsinchu (TW); Meng-Fan Chang, Taichung (TW); Keng-Hao Yang, Chiayi County (TW)

(73) Assignee: National Chiao Tung University, Hsinchu (TW)

( * ) Notice: Subject to any disclaimer, the term of this patent is extended or adjusted under 35 U.S.C. 154(b) by 183 days.

(21) Appl. No.: 15/163,682

(22) Filed: May 25, 2016

(65) Prior Publication Data
US 2017/0220480 A1 Aug. 3, 2017

(30) Foreign Application Priority Data
Jan. 29, 2016 (TW) .............................. 105102783 A (51) Int. Cl.
*G06F 12/0897* (2016.01)
*G06F 12/0891* (2016.01)
*G06F 12/1009* (2016.01)

(52) U.S. Cl.
CPC ...... *G06F 12/0897* (2013.01); *G06F 12/0891* (2013.01); *G06F 12/1009* (2013.01); *G06F 2212/1021* (2013.01); *G06F 2212/2228* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 5,848,428 A * | 12/1998 | Collins | ............... | G06F 12/0864 711/127 |
| 7,330,934 B2 * | 2/2008 | Schubert | ............. | G06F 12/0846 365/49.1 |
| 9,026,731 B2 * | 5/2015 | Loh | ......................... | G06F 12/00 711/118 |

\* cited by examiner

*Primary Examiner* — Tracy Chan
(74) *Attorney, Agent, or Firm* — JCIPRNET (57) ABSTRACT

A tag memory and a cache system with automating tag comparison mechanism and a cache method thereof are provided. The tag memory in the cache system includes a memory cell array, sensing amplifiers and a tag comparison circuit. The memory cell array stores cache tags, and outputs row tags of the cache tags according to an index in a memory address. The sensing amplifiers perform signal amplifications on the row tags to serve as comparison tags. The tag comparison circuit performs parallel comparisons between a target tag in the memory address and the row tags. When one of the row tags matches the target tag, the tag comparison circuit outputs a location of the matched row tag to serve as a first column address. The first column address is a column address where the memory address corresponds to a first data memory in the cache system.

12 Claims, 5 Drawing Sheets

TAG MEMORY AND CACHE SYSTEM WITH AUTOMATING TAG COMPARISON MECHANISM AND CACHE METHOD THEREOF

CROSS-REFERENCE TO RELATED APPLICATION

This application claims the priority benefit of Taiwan application serial no. 105102783, filed on Jan. 29, 2016. The entirety of the above-mentioned patent application is hereby incorporated by reference herein and made a part of this specification.

BACKGROUND OF THE INVENTION

1. Field of the Invention

The invention relates to a cache technique, and particularly relates to a tag memory and a cache system with an automating tag comparison mechanism and a cache method thereof.

2. Description of Related Art

In a computer system, a processor may use a cache memory to improve a data access performance thereof to thereby increase an overall performance of the computer system. The cache memory including an area storing tags and an area storing data. Tags are accessed and compared to determine whether the current cache memory stores required data. In general, as a static random access memory (SRAM) has a fast accessing speed, SRAM is commonly used to store tags. When the capacity of the cache memory is increased to facilitate the overall performance of the computer system, a storage of tags is increased as well. However, increasing the capacity (or increasing the number of SRAM) of SRAM to store a large number of tags may significantly increase the hardware cost. Thus, a memory device, such as dynamic random access memory (DRAM), which is of a higher capacity and lower cost may be used to store tags.

For a memory such as DRAM, it is required to wait a period of time to sequentially output the tags to be compared after receiving a read command and an address, and the tags to be compared are unable to be output at the same time, making it unable to perform a parallel comparison for the tags to be compared. Therefore, the time for tag comparison is significantly increased, and the overall performance of the computer system is compromised.

SUMMARY OF THE INVENTION

The invention provides a tag memory and a cache system having an automating tag comparison mechanism and a cache method thereof. When a memory device (e.g., the various kinds of dynamic random access memory (DRAM), but the invention is not limited thereto) having a higher capacity and a lower cost is used to store tags, time required to compare the tags may be shortened to facilitate an overall performance of the cache system.

A tag memory according to an embodiment of the invention includes a memory cell array, a plurality of sensing amplifiers and a tag comparison circuit. The memory cell array is configured to store a plurality of cache tags. The memory cell array receives an index related to a memory address and outputs a plurality of row tags in the cache tags based on the index. The sensing amplifiers are coupled to the memory cell array to receive the row tags and perform a signal amplification process on the row tags to serve as a plurality of comparison tags. The tag comparison circuit is configured to receive a target tag related to the memory address and coupled to the sensing amplifiers to receive the comparison tags. The tag comparison circuit compares the target tag with each of the comparison tags parallelly. When one of the comparison tags matches the target tag, the tag comparison circuit outputs a location of the matched comparison tag to serve as a first column address. The first column address is a column address where the memory address corresponds to a first data memory.

According to an embodiment of the invention, the index corresponds to a row block in the memory cell array, and the row tags are stored in the row block. The tag comparison circuit includes a register, a judgment circuit, and an address determination circuit. The register is configured to store the comparison tags. The judgment circuit is coupled to the register to receive the comparison tags, performs a parallel comparison between each of the comparison tags and the target tag, and generates a comparison result accordingly. The address determination circuit is coupled to the register to receive the comparison tags and coupled to the judgment circuit to receive the comparison result. When one of the comparison tags matches the target tag, the judgment circuit outputs the comparison result as "hit", and the address determination circuit outputs the location of the matched comparison tag in the row block to serve as the first column address.

According to an embodiment of the invention, the tag comparison circuit further receives an index. The index includes an upper level auxiliary tag, and each of the comparison tags includes a lower level tag and a rest tag. The tag comparison circuit performs a parallel comparison between the target tag and the lower level tag of each of the comparison tags. If the lower level tag of one of the comparison tags matches the target tag, the tag comparison circuit further determines whether the rest tag in the matched comparison tag matches the upper level auxiliary tag in the index If not, the tag comparison circuit outputs the location of the matched comparison tag as the first column address. The first data memory is a level of cache of a plurality of levels of cache.

According to an embodiment of the invention, each of the comparison tags further includes an upper level flag. If the tag comparison circuit determines that the rest tag in the matched comparison tag matches the upper level auxiliary tag in the index, the tag comparison circuit further determines whether the upper level flag in the matched comparison tag is set, and if the upper level flag in the matched comparison tag is not set, the tag comparison circuit outputs the location of the matched comparison tag to serve as the first column address.

According to an embodiment of the invention, each of the comparison tags further includes a way position. If the upper level flag in the matched comparison tag is set, the tag comparison circuit outputs the way position of the matched comparison tag as a second column address. The second column address is a column address where the memory address corresponds to a second data memory. The second data memory is another level of cache in the levels of cache, and the first data memory is located at a next level of the second data memory. A bit length of the upper level auxiliary tag is related to a difference in memory capacity between the first data memory and the second data memory.

A cache system according to an embodiment of the invention includes the tag memory having the automating tag comparison mechanism, the first data memory, and a processor. The processor is configured to transmit the memory address to access data. The tag memory outputs the first column address to the first data memory, such that the first data memory stores or outputs the data based on the first column address and a first row address related to the memory address.

A cache method according to an embodiment of the invention includes steps as follows. A plurality of cache tags are stored in a memory cell array in a tag memory. A memory address is provided by a processor. A plurality of row tags in the cache tags are provided based on an index related to the memory address by using the memory cell array. A signal amplification process is performed on the row tags to serve as a plurality of comparison tags by a plurality of sensing amplifiers. A parallel comparison is performed between a target tag related to the memory address and each of the comparison tags by a tag comparison circuit in the tag memory. When one of the comparison tags matches the target tag, a location of the matched comparison tag is provided as a first column address by the tag comparison circuit. Data is stored or outputted by a first data memory based on the first column address and a first row address related to the memory address.

Based on above, the tag memory of the cache system according to the embodiments of the invention has an automating tag comparison mechanism. In a cache system adopting a cache with a high memory capacity (e.g., a DRAM cache), the parallel comparison between the target tag and the comparison tags may be performed internally in the tag memory, instead of sequentially outputting the comparison tags from the tag memory and then sequentially comparing the comparison tags with the target tag. Thus, the time required to compare the target tag and the comparison tags may be shortened, and the overall performance of the cache system is consequently facilitated. Also, the cache system and the cache method according to the embodiments of the invention are capable of incorporating the tags of a plurality of levels of cache to perform comparison at the same time. Therefore, the time required for the cache system to compare the tags of the plurality of levels of cache is reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

Figure 1:
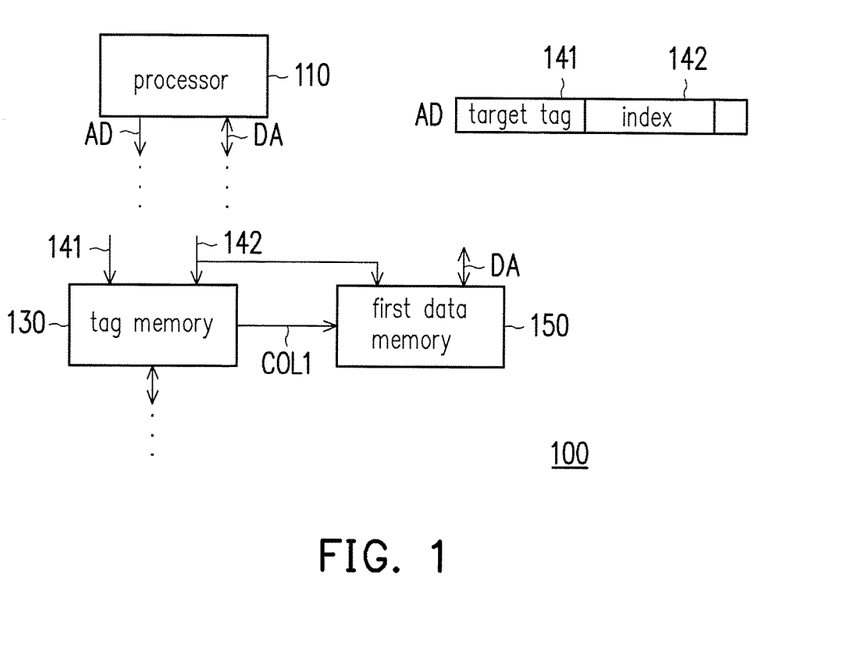
FIG. 1 is a cache system according to an embodiment of the invention.
Figure 2:
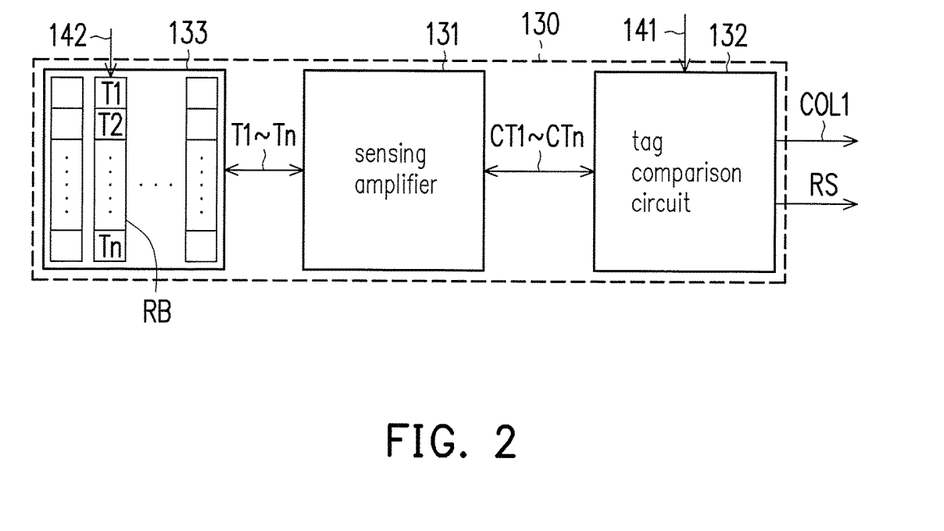
FIG. 2 is a schematic view illustrating a framework of a tag memory of FIG. 1.

Referring to FIGS. 1 and 2 together, FIG. 1 is a cache system 100 according to an embodiment of the invention, and FIG. 2 is a schematic view illustrating a framework of a tag memory 130 of FIG. 1. The cache system 100 may include a processor 110, the tag memory 130, and a first data memory 150. However, the invention is not limited thereto. The processor 110 is configured to transmit a memory address AD to access data DA. In addition, address mapping may be performed on the memory address AD by the processor 110 or a controller (not shown, such as a north bridge chip, but the invention is not limited thereto) of the cache system 100, such that the memory address AD could be divided into a target tag 141 and an index 142.

The tag memory 130 and the first data memory 150 may be considered as one of a plurality of levels of cache in the cache system 100. The tag memory 130 is configured to store a plurality of cache tags. The tag memory 130 may perform a parallel comparison between the target tag 141 in the memory address AD and a cache tag corresponding to the index 142, so as to determine whether the data DA is located in the first data memory 150. Details in this respect will be described in subsequent paragraphs. In an embodiment of the invention, a plurality of memory cells, such as a plurality of dynamic random access memory (DRAM) cells, a plurality of embedded DRAM (eDRAM) cells, or a plurality of resistive memory (RRAM) cells, may be used as the first data memory 150. However, the invention is not limited thereto.

Details concerning the framework and operation of the tag memory 130 are described in the following. As shown in FIG. 2, the tag memory 130 may include a memory cell array 133, a sensing amplifier 131, and a tag comparison circuit 132. However, the invention is not limited thereto. The memory cell array 133 is configured to store a plurality of cache tags, as shown in FIG. 2. The memory cell array 133 may receive the index 142 related to the memory address AD. The memory cell array 133 may correspond to a row block RB based on the index 142, and may output row tags T1 to Tn which are the cache tags stored in the row block RB accordingly. In an embodiment of the invention, a plurality of memory cells, such as a plurality of DRAM cells, a plurality of eDRAM cells, or a plurality of RRAM cells may be used as the memory cell array 133. However, the invention is not limited thereto.

The sensing amplifier 131 is coupled to the memory cell array 133 to receive the row tags T1 to Tn, and may perform a signal amplification process on the row tags T1 to Tn to serve as comparison tags CT1 to CTn.

The tag comparison circuit 132 is configured to receive the target tag 141 related to the memory address AD and coupled to the sensing amplifier 131 to receive the comparison tags CT1 to CTn. The tag comparison circuit 132 performs a parallel comparison between the target tag 141 and each of the comparison tags CT1 to CTn. When one of the comparison tags (the comparison tag CT1, for example) matches the target tag 141, the data DA that the processor 110 intends to access with the memory address AD is located at the first data memory 150. Thus, the tag comparison circuit 132 may output a location of the matched comparison tag (the comparison tag T1) as a first column address COL1. Here, the first column address COL1 is a column address where the memory address AD corresponds to the first data memory 150.

More specifically, the tag memory 130 may output the first column address COL1 to the first data memory 150, such that the data DA may be stored or outputted by the first data memory 150 based on the first column address COL1 and a first row address related to the memory address AD. In other words, the data DA may be written to a memory location corresponding to the first row address and the first column address COL1 in the first data memory 150, or read from the memory location corresponding to the first row address and the first column address COL1 in the first data memory 150 and then transmitted to the previous level of cache or the processor 110. It should be noted that, in order to reduce access waiting time of the first data memory 150 to the data DA, before the tag memory 130 outputs the first column address COL1 to the first data memory 150, row data corresponding to the first row address in the first data memory 150 may be activated. Thus, once the first data memory 150 receives the first column address COL1, the data DA may be written to the first data memory 150 or outputted from the first data memory 150.

It should be noted that, if the first data memory 150 is DRAM, the index 142 may be divided into a first bank address and the first row address through address mapping based on a capacity of the first data memory 150. Accordingly, the data DA may be stored or outputted by the first data memory 150 based on the first bank address, the first row address and the first column address COL1.

Figure 3:
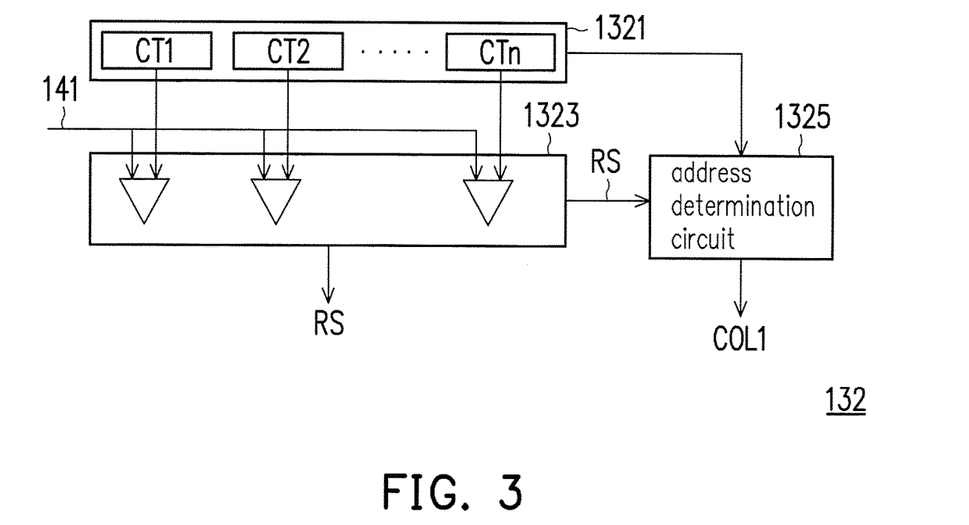
FIG. 3 is a schematic view illustrating a framework of a tag comparison circuit of FIG. 2.

Referring to FIG. 3, FIG. 3 is a schematic view illustrating a framework of the tag comparison circuit 132 of FIG. 2. The tag comparison circuit 132 may include a register 1321, a judgment circuit 1323, and an address determination circuit 1325. The register 1321 is configured to store the comparison tags CT1 to CTn. The judgment circuit 1323 is coupled to the register 1321 to receive the comparison tags CT1 to CTn, performs the parallel comparison between each of the comparison tags CT1 to CTn and the target tag 141, and generates a comparison result RS accordingly. The address determination circuit 1325 is coupled to the register 1321 to receive the comparison tags CT1 to CTn, and coupled to the judgment circuit 1323 to receive the comparison result RS. When one of the comparison tags (assumed to be the comparison tag CT1 here) matches the target tag 141, the judgment circuit 1323 may output the comparison result RS "hit", and the address determination circuit 1325 may output the location of the matched comparison tag (the comparison tag CT1) in the row block RB as the first column address COL1. For example, if the comparison tag CT1 is stored in the first location of the row block RB, the address determination circuit 1325 may output the first column address COL1 with an address value "1". However, the invention is not limited thereto. Alternatively, when none of the comparison tags CT1 to CTn matches the target tag 141, the judgment circuit 1323 may output the comparison result RS "miss".

It should be noted that, in the cache system 100 shown in the embodiment of FIG. 1 of the invention, the target tag 141 is input to the tag memory 130, and the parallel comparison between the target tag 141 and the comparison tags CT1 to CTn is performed internally in the tag memory 130, instead of sequentially outputting the comparison tags CT1 to CTn from the tag memory 130 and then sequentially comparing the comparison tags CT1 to CTn with the target tag 141. Thus, the time required for comparing the target tag 141 and the comparison tags CT1 to CTn is able to be shortened, and an overall performance of the cache system 100 is consequently facilitated.

In an embodiment of the invention, in order to reduce the time required to compare the tags in the plurality of levels of cache in the cache system, tags in at least two levels of the levels of cache may be incorporated to be compared at the same time. For the ease of illustration, an embodiment where tags of two levels are incorporated is described in the following as an example, while the embodiments incorporating tags of three or more levels may be inferred based on the example.

Figure 4:
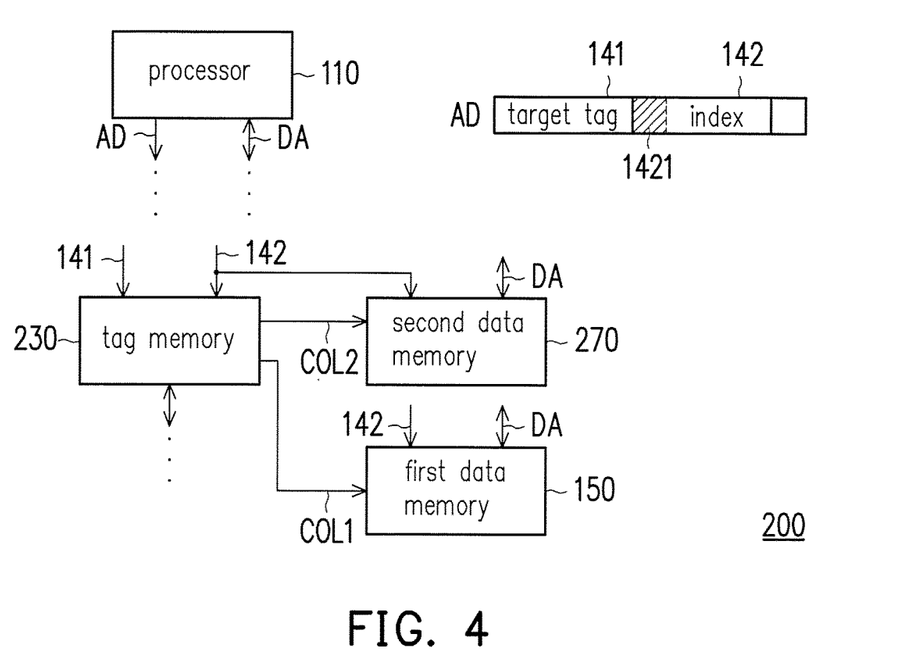
FIG. 4 is a cache system according to another embodiment of the invention.

Referring to FIG. 4, FIG. 4 is a cache system 200 according to another embodiment of the invention. The cache system 200 may include the processor 110, a tag memory 230, the first data memory 150, and a second data memory 270. However, the invention is not limited thereto. The processor 110 and the first data memory 150 of the cache system 200 are respectively similar to the processor 110 and the first data memory 150 of the cache system 100 shown in FIG. 1. Thus, details in these respects may be referred to the foregoing descriptions and will thus not be repeated in the following. In an embodiment of the invention, memory cells such as a plurality of dynamic random access memory (DRAM) cells, a plurality of embedded DRAM (eDRAM) cells, or a plurality of resistive memory (RRAM) cells may be used as the second data memory 270. However, the invention is not limited thereto.

Compared with the cache system 100 shown in FIG. 1 where the tag memory 130 and the first data memory 150 serve as one of the levels of cache in the cache system 100, the tag memory 230 and the first data memory 150 are considered as one of a plurality of levels of cache in the cache system 200, and the tag memory 230 and the second data memory 270 may be considered as another of the levels of cache in the cache system 200. In addition, the first data memory 150 is at the next level of the second data memory 270, and the memory capacity of the first data memory 150 is greater than a memory capacity of the second data memory 270. In other words, two different levels of cache in the cache system 200 may share the tag memory 230. More specifically, the tag memory 230 may store the cache tags at different levels of cache.

The processor 110 may transmit the memory address AD to access the data DA. In addition, address mapping may be performed on the memory address AD by the processor 110 or a controller (not shown, such as a north bridge chip, but the invention is not limited thereto) of the cache system 200, such that the memory address AD could be divided into the target tag 141 and the index 142.

In the meantime, the cache memory 230 may also determine whether the data DA are located in the first data memory 150 or the second data memory 270. If the tag memory 230 determines that the data DA that the processor 110 intends to access with the memory address AD is located in the first data memory 150, the first column address COL1 may be generated and output to the first data memory 150. If the tag memory 230 determines that the data DA that the processor 110 intends to access with the memory address AD is located in the second data memory 270, a second column address COL2 may be generated and output to the second data memory 270.

Figure 5:
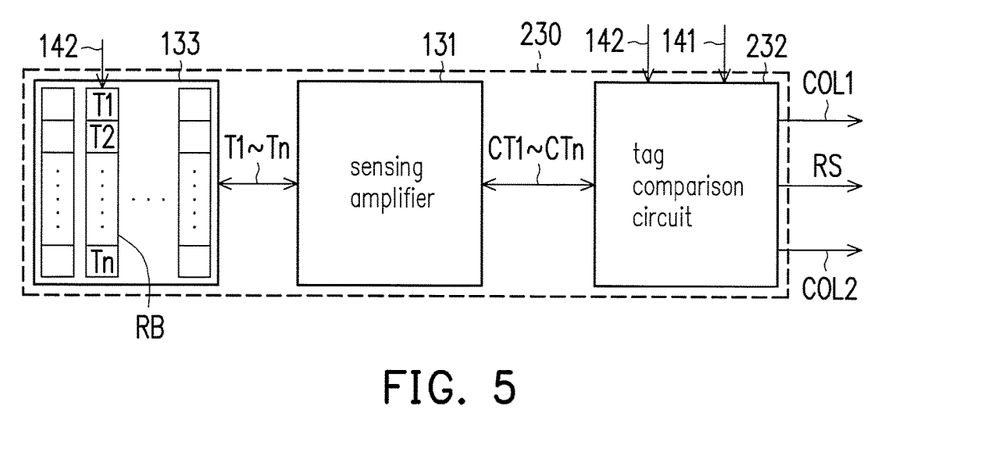
FIG. 5 is a schematic view illustrating a framework of a tag memory of FIG. 4.

Referring to FIGS. 4 and 5 together, FIG. 5 is a schematic view illustrating a framework of the tag memory 230 of FIG. 4. The tag memory 230 may include the memory cell array 133, the sensing amplifier 131, and a tag comparison circuit 232. However, the invention is not limited thereto. The memory cell array 133 is configured to store a plurality of cache tags, and each of the cache tags may have information of different levels of cache. Details in this respect will be described in the subsequent paragraphs.

Generally speaking, for the cache at two different levels, the tags and indices obtained with the memory address AD through address mapping may only differ slightly.

Figure 6A:
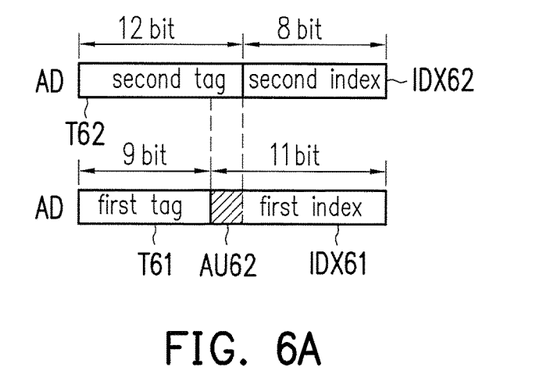
FIG. 6A is a schematic view illustrating address mapping of a memory address based on a first data memory and a second data memory according to an embodiment of the invention.

Taking the second data memory 270 having a smaller memory capacity shown in FIG. 6A as an example, a tag (referred to as a second tag T62 in the following) divided from the 20-bit memory address AD through address mapping may be 12 bits, and an index (referred to as a second index IDX62 in the following) thereof is 8 bits. As for the first data memory 150 having a larger memory capacity 150, assuming the memory capacity of the first data memory 150 is 8 times of that of the second data memory 270, a tag (referred to as a first tag T61 in the following) divided from the 20-bit memory address AD through address mapping is 9 bits, and an index (referred to as a first index IDX61 in the following) thereof is 11 bits. The additional three bits (due to the difference in memory capacity) of the second tag T62 as compared to the first tag T61 is the first three bits (referred to as an upper level auxiliary tag AU62) of the first index IDX61. However, the invention is not limited thereto. In other words, a combination of the first tag T61 and the upper level auxiliary tag AU62 (i.e., the first three bits) of the first index IDX61 is the second tag T62. Thus, in an embodiment of the invention, by performing one address mapping on the memory address AD (e.g., performing address mapping on the memory address AD based on the first data memory 150) and taking the difference in memory capacity between the first data memory 150 and the second data memory 270 into consideration, the target tags of the memory address AD corresponding to two different levels of cache may be obtained at the same time.

With the setting described herein, referring to FIGS. 4 and 5 again, the target tag 141 and the index 142 may be obtained by performing address mapping on the memory address AD based on the first data memory 150. As indicated above, the memory cell array 133 may correspond to the row block RB based on the index 142, and may output the row tags T1 to Tn which are the cache tags stored in the row block RB accordingly. The sensing amplifier 131 may perform the signal amplification process on the column tags T1 to Tn to serve as the comparison tags CT1 to CTn.

Figure 6B:
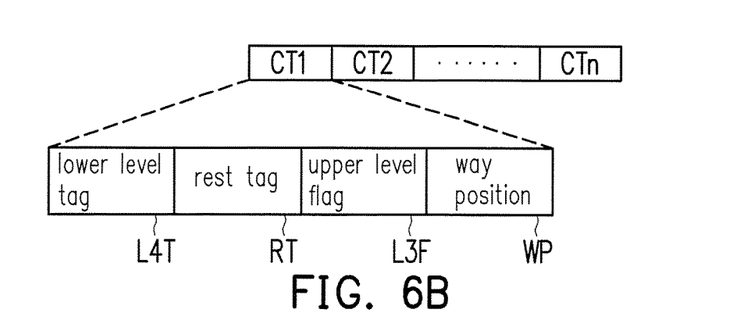
FIG. 6B is a schematic view illustrating contents of each cache tag according to an embodiment of the invention.

It should be noted that each of the cache tags (including the comparison tags CT1 to CTn after the signal amplification process) of FIG. 5 may include a lower level tag L4T, a rest tag RT, a upper level flag L3F, and a way position WP, as shown in the comparison tag CT1 in FIG. 6B, for example. However, the invention is not limited thereto. The tag comparison circuit 232 may perform a parallel comparison between the target tag 141 and the lower level tag L4T in each of the comparison tags CT1 to CTn. If the lower level tag L4T of one of the comparison tags (assumed to be the comparison tag CT1 here) matches the target tag 141, the data DA that the processor 110 intends to access with the memory address AD is located in the first data memory 150 or the second data memory 270. Then, the tag comparison circuit 232 further determines whether the rest tag RT of the matched comparison tag (the comparison tag CT1) matches the upper level auxiliary tag 1421 (e.g., the three-bit upper level auxiliary tag AU62 of the first index IDX61 shown in FIG. 6A). If not, it is determined that the data DA that the processor 110 intends to access with the memory address AD are located in the first data memory 150, instead of the second data memory 270. Thus, the tag comparison circuit 232 may output the location of the matched comparison tag (the comparison tag CT1) in the row block RB as the first column address COL1. Then, the tag memory 230 may output the first column address COL1 to the first data memory 150, such that the data DA may be stored or outputted by the first data memory 150 based on the first column address COL1 and the first row address related to the memory address AD.

If the tag comparison circuit 232 determines that the rest tag RT of the matched comparison tag (the comparison tag CT1) matches the upper level auxiliary tag 1421 in the index 142, the tag comparison circuit 232 further determines whether the upper level flag L3F in the matched comparison tag (comparison tag CT1) is set. If the upper level flag L3F in the matched comparison tag (comparison tag CT1) is not set, the data DA that the processor 110 intends to access with the memory address AD are not located in the second data memory 270, but located in the first data memory 150. Thus, the tag comparison circuit 232 may output the location of the matched comparison tag (the comparison tag CT1) in the row block RB as the first column address COL1. As indicated above, the tag memory 230 may output the first column address COL1 to the first data memory 150, such that the data DA may be stored or outputted by the first data memory 150 based on the first column address COL1 and the first row address related to the memory address AD.

Alternatively, under the circumstance that the rest tag RT in the matched comparison tag (the comparison tag CT1) matches the upper level auxiliary tag 1421 in the index 142, if the upper level flag L3F of the matched comparison tag (the comparison tag CT1) is set, the data DA that the processor 110 intends to access with the memory address AD are located in the second data memory 270. Thus, the tag comparison circuit 232 may output the way position WP of the matched comparison tag (the comparison tag CT1) as the second column address COL2. Then, the tag memory 230 may output the second column address COL2 to the second data memory 270, such that the data DA may be stored or outputted by the second data memory 270 based on the second column address COL2 and the second row address related to the memory address AD. It should be noted that, in order to reduce access waiting time of the second data memory 270 to the data DA, before the tag memory 230 outputs the second column address COL2 to the second data memory 270, row data corresponding to the second row address in the second data memory 270 may be activated. Thus, once the second data memory 270 receives the second column address COL2, the data DA may be written to the second data memory 270 or outputted from the second data memory 270.

Figure 7:
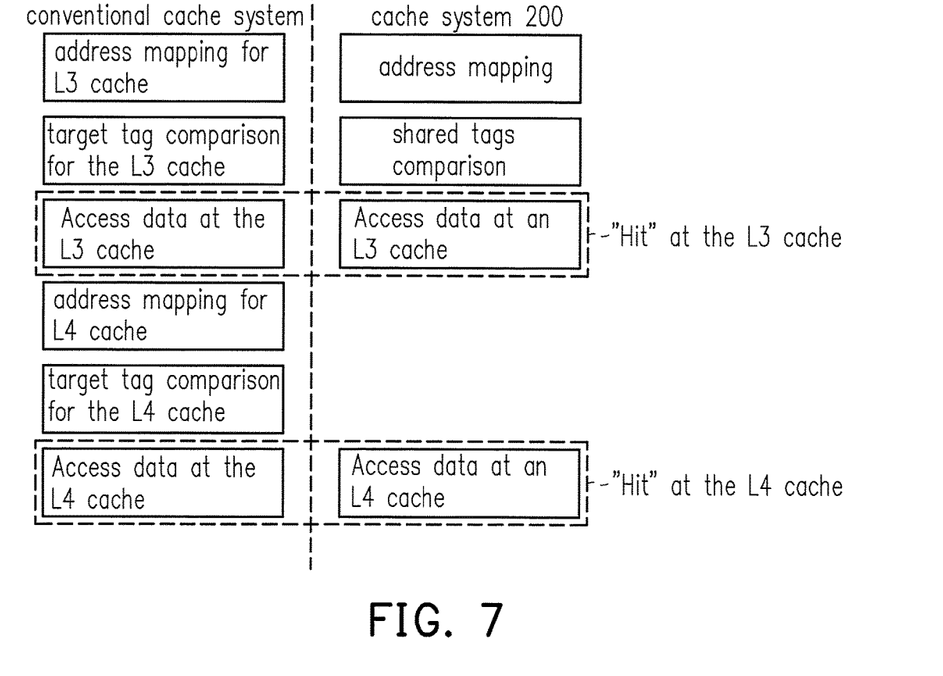
FIG. 7 is a schematic view comparing operational processes of a conventional cache system and the cache system of FIG. 4.

Referring to FIG. 7, FIG. 7 is a schematic view comparing operational processes of a conventional cache system and the cache system 200 of FIG. 4 according to the embodiment of the invention. Here, the second data memory 270 is described as a level 3 (L3) cache, for example, and the first data memory 150 is described as a level 4 (L4) cache, for example. After a "miss" in a level 2 (L2) cache, the conventional cache system needs to perform address mapping for L3 and then compare the target tag for L3. If a comparison result indicates "hit" at the L3 cache, relevant operations at the L4 cache are omitted, and data are directly accessed at the L3 cache. If the comparison result indicates "miss" at the L3 cache, operations of the L4 cache are performed. First of all, address mapping for L4 is performed. Then, the target tag for L4 is compared. If a comparison result indicates "hit" at the L4 cache, data are directly accessed at the L4 cache. If the comparison result indicates "miss" at the L4 cache, data accessing may be performed at a level 5 (L5) cache or a main memory.

As for the cache system 200 shown in FIG. 4 according to the embodiment of the invention, when the target tag (e.g., the second tag T62 shown in FIG. 6A) of the L3 cache is compared, the target tag (e.g., the first tag T61 shown in FIG. 6A) of the L4 cache may also be compared, and whether the data are located at the L3 cache or the L4 cache is determined. Thus, only a single process of address mapping and a single process of comparing the shared tags are required. Consequently, time required for the cache system 200 to compare the target tags of two levels of cache (L3 cache and L4 cache) is reduced.

Figure 8:
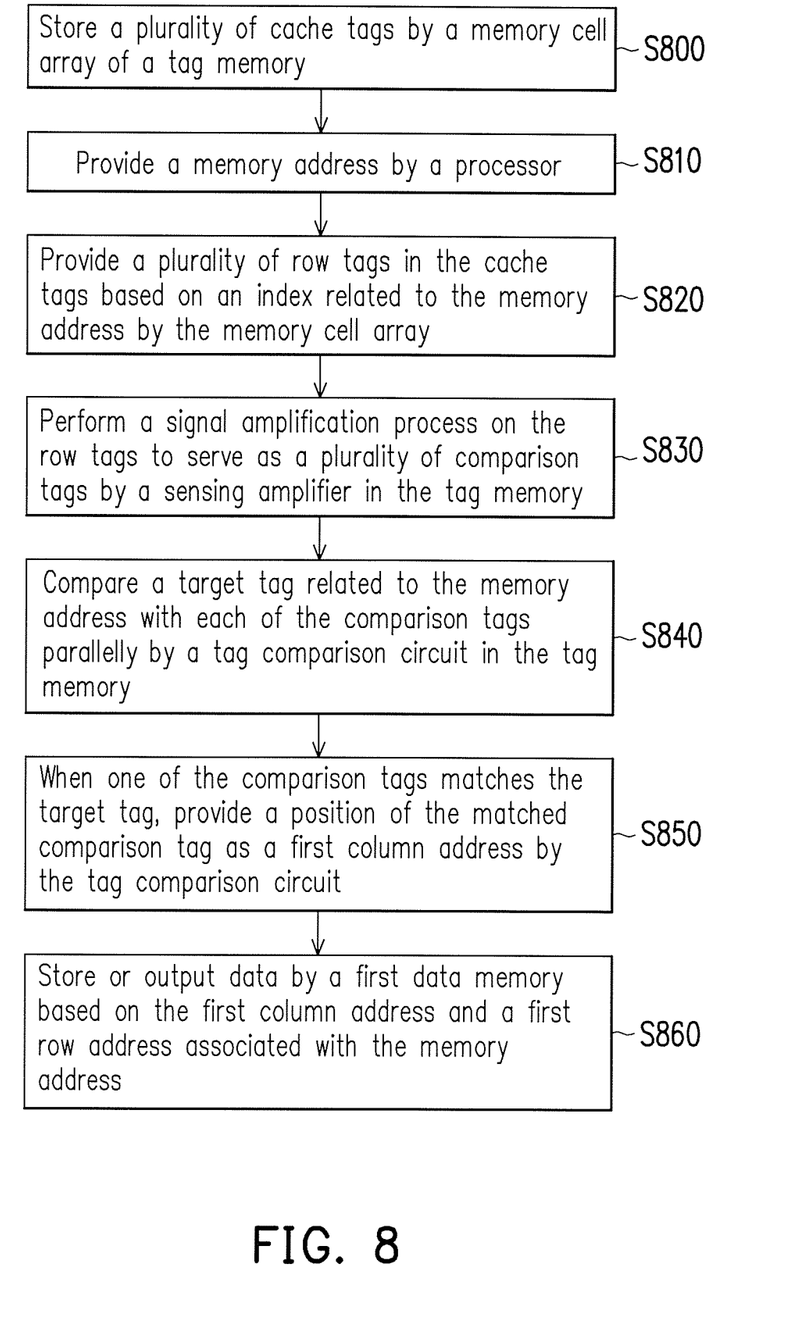
FIG. 8 is a flowchart illustrating a cache method according to an embodiment of the invention.

FIG. 8 is a flowchart illustrating a cache method according to an embodiment of the invention. Referring to FIGS. 1 to 3 and FIG. 8 together, the cache method according to the exemplary embodiment is suitable for the cache system 100 of FIG. 1. The cache method according to the exemplary embodiment includes steps as follows. First of all, at Step S800, the cache tags are stored in the memory cell array 133 in the tag memory 130. Then, at Step S810, the memory address AD is provided by the processor 110. Subsequently, at Step S820, the row tags T1 to Tn in the cache tags are provided by the memory cell array 133 based on the index 142 related to the memory address AD. Then, at Step S830, the signal amplification process is performed on the row tags T1 to Tn to serve as the comparison tags CT1 to CTn by the sensing amplifier 131 in the tag memory 130. Subsequently, at Step S840, the parallel comparison between the target tag 141 related to the memory address AD and each of the comparison tags CT1 to CTn is performed by the tag comparison circuit 132 in the tag memory 130. Then, at Step S850, when one of the comparison tags CT1 to CTn matches the target tag 141, the location of the matched comparison tag is provided as the first column address COL1 by the tag comparison circuit 132. Lastly, at Step S860, the data DA may be stored or outputted by the first data memory 150 based on the first column address COL1 and the first row address related to the memory address AD.

In addition, sufficient teaching, suggestions, and implementation illustration concerning the details of the cache method according to the embodiment of the invention may be obtained from the descriptions about the embodiments of FIGS. 1 to 7. Thus, details in these respects will not be repeated in the following.

In view of the foregoing, the tag memory of the cache system according to the embodiments of the invention has an automating tag comparison mechanism. In a cache system adopting a cache with a high memory capacity (e.g., a DRAM cache), the parallel comparison between the target tag and the comparison tags may be performed internally in the tag memory, instead of sequentially outputting the comparison tags form the tag memory and then sequentially comparing the comparison tags with the target tag. Thus, the time required to compare the target tag and the comparison tags may be shortened, and the overall performance of the cache system is consequently facilitated. Also, the cache system and the cache method according to the embodiments of the invention are capable of incorporating the tags of a plurality of levels of cache to perform comparison at the same time. Therefore, the time required for the cache system to compare the tags of the plurality of levels of cache is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tag memory having an automating tag comparison mechanism, comprising:
   and the first column address is a column address where the memory address corresponds to a first data memory;
   wherein the tag comparison circuit further receives the index, the index comprises an upper level auxiliary tag, and each of the comparison tags comprises a lower level tag, a rest tag and an upper level flag, wherein
   the tag comparison circuit performs a parallel comparison between the target tag and the lower level tag of each of the comparison tags,
   if the lower level tag of one of the comparison tags matches the target tag, the tag comparison circuit further determines whether the rest tag in the matched comparison tag matches the upper level auxiliary tag in the index, and
   if the rest tag in the matched comparison tag does not match the upper level auxiliary tag in the index, the tag comparison circuit outputs the location of the matched comparison tag as the first column address, wherein the first data memory is a level of cache of a plurality of levels of cache,
   if the rest tag in the matched comparison tag matches the upper level auxiliary tag in the index, the tag comparison circuit further determines whether the upper level flag in the matched comparison tag is set, and
   if the upper level flag in the matched comparison tag is not set, the tag comparison circuit outputs the location of the matched comparison tag to serve as the first column address.

2. The tag memory as claimed in claim 1, wherein the index corresponds to a row block in the memory cell array, the row tags are stored in the row block, and the tag comparison circuit comprises:
   a register, configured to store the comparison tags;
   a judgment circuit, coupled to the register to receive the comparison tags, performing a parallel comparison between each of the comparison tags and the target tag, and generating a comparison result accordingly; and
   an address determination circuit, coupled to the register to receive the comparison tags and coupled to the judgment circuit to receive the comparison result,
   wherein when one of the comparison tags matches the target tag, the judgment circuit outputs the comparison result "hit", and the address determination circuit outputs the location of the matched comparison tag in the row block to serve as the first column address.

3. The tag memory as claimed in claim 2, wherein when none of the comparison tags matches the target tag, the judgment circuit outputs the comparison result "miss".

4. The tag memory as claimed in claim 1, wherein each of the comparison tag further comprises a way position, wherein if the upper level flag in the matched comparison tag is set, the tag comparison circuit outputs the way position of the matched comparison tag as a second column address, wherein the second column address is a column address where the memory address corresponds to a second data memory, wherein the second data memory is another level of cache in the levels of cache, and the first data memory is located at a next level of the second data memory, wherein a bit length of the upper level auxiliary tag is related to a difference in memory capacity between the first data memory and the second data memory.

5. A cache system, comprising:
the tag memory having the automating tag comparison mechanism as claimed in claim 1;
the first data memory; and
a processor, configured to transmit the memory address to access data;
wherein the tag memory outputs the first column address to the first data memory, such that the first data memory stores or outputs the data based on the first column address and a first row address related to the memory address.

6. The cache system as claimed in claim 5, wherein before the tag memory outputs the first column address to the first data memory, row data corresponding to the first row address in the first data memory is activated.

7. The cache system as claimed in claim 5, further comprising a second data memory, wherein each of the comparison tags further comprises a way position, wherein
if the upper level flag in the matched comparison tag is set, the tag comparison circuit outputs the way position of the matched comparison tag as a second column address,
wherein the tag memory outputs the second column address to the second data memory, such that the data is stored or outputted by the second data memory based on the second column address and a second row address related to the memory address.

8. The cache system as claimed in claim 7, wherein each of the first data memory and the second data memory is a level of cache in a plurality of levels of cache, the first data memory is located at a next level of the second data memory, and a memory capacity of the first data memory is higher than a memory capacity of the second data memory,
wherein a bit length of the upper level auxiliary tag is related to a difference in memory capacity between the first data memory and the second data memory.

9. A cache method, comprising:
storing or outputting data by a first data memory based on the first column address and a first row address related to the memory address;

wherein each of the comparison tags comprises a lower level tag, a rest tag and an upper level flag, the index comprises an upper level auxiliary tag, and the step of performing the parallel comparison between the target tag and each of the comparison tags comprises:
performing, by the tag comparison circuit, the parallel comparison between the target tag and the lower level tag of each of the comparison tags, wherein when one of the comparison tags matches the target tag, the step of providing the location of the matched comparison tag as the first column address comprises:
determining, by the tag comparison circuit, whether the rest tag in the matched comparison tag matches the upper level auxiliary tag in the index when the lower level tag of the comparison tag of the comparison tags matches the target tag, and if the rest tag in the matched comparison tag does not match the upper level auxiliary tag in the index, providing the location of the matched comparison tag as the first column address;
further determining, by the tag comparison circuit, whether the upper level flag in the matched comparison tag is set if the rest tag in the matched comparison tag matches the upper level auxiliary tag in the index; and
providing, by the tag comparison circuit, the location of the matched comparison tag to serve as the first column address if the upper level flag in the matched comparison tag is not set.

10. The cache method as claimed in claim 9, further comprising:
activating row data corresponding to the first row address in the first data memory before the first column address is provided by the tag memory to the first data memory.

11. The cache method as claimed in claim 9, wherein each of the comparison tags further comprises a way position, and the cache method further comprises:
providing, by the tag comparison circuit, the way position of the matched comparison tag as a second column address if the upper level flag in the matched comparison tag is set; and
storing or outputting the data by a second data memory based on the second column address and a second row address related to the memory address.

12. The cache method as claimed in claim 11, wherein each of the first data memory and the second data memory is a level of cache in a plurality of levels of cache, the first data memory is located at a next level of the second data memory, and a memory capacity of the first data memory is higher than a memory capacity of the second data memory,
wherein a bit length of the upper level auxiliary tag is related to a difference in memory capacity between the first data memory and the second data memory.

* * * * *